United States Patent
Maeda et al.

(10) Patent No.: US 8,634,153 B2
(45) Date of Patent: *Jan. 21, 2014

(54) PERPENDICULAR MAGNETIC RECORDING MEDIUM, METHOD OF MANUFACTURING THE SAME, AND MAGNETIC RECORDING/REPRODUCTION APPARATUS

(75) Inventors: Tomoyuki Maeda, Kawasaki (JP); Yousuke Isowaki, Yokohama (JP); Akira Watanabe, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

This patent is subject to a terminal disclaimer.

(21) Appl. No.: 13/351,167

(22) Filed: Jan. 16, 2012

(65) Prior Publication Data

US 2012/0275059 A1    Nov. 1, 2012

(30) Foreign Application Priority Data

Apr. 26, 2011 (JP) .................. 2011-098303

(51) Int. Cl.
*G11B 5/09* (2006.01)
*G11B 5/82* (2006.01)
*G11B 5/65* (2006.01)
*G11B 5/66* (2006.01)

(52) U.S. Cl.
USPC ........... 360/48; 360/135; 428/836.1; 428/831

(58) Field of Classification Search
None
See application file for complete search history.

(56) References Cited

U.S. PATENT DOCUMENTS

| | | | |
|---|---|---|---|
| 6,841,224 B2 | 1/2005 | Kamata et al. | |
| 7,166,261 B2 | 1/2007 | Kamata et al. | |
| 7,232,621 B2 | 6/2007 | Kamata et al. | |
| 7,588,843 B2 | 9/2009 | Iida et al. | |
| 2002/0142192 A1 | 10/2002 | Kamata et al. | |
| 2004/0191557 A1 | 9/2004 | Kamata et al. | |
| 2004/0258833 A1 | 12/2004 | Kamata et al. | |
| 2007/0224455 A1 | 9/2007 | Iida et al. | |
| 2009/0117409 A1* | 5/2009 | Lee et al. | 428/836.1 |
| 2010/0165510 A1* | 7/2010 | Takahashi et al. | 360/135 |
| 2010/0232054 A1 | 9/2010 | Mabuchi et al. | |

FOREIGN PATENT DOCUMENTS

| | | |
|---|---|---|
| JP | 2002-359138 | 12/2002 |
| JP | 3886802 B2 | 12/2006 |
| JP | 2007-287300 | 11/2007 |
| JP | 2010-033648 | 2/2010 |
| JP | 2010-218610 | 9/2010 |

OTHER PUBLICATIONS

IDS Information Sheet in 1 page.

* cited by examiner

*Primary Examiner* — Regina N Holder
(74) *Attorney, Agent, or Firm* — Knobbe, Martens, Olson & Bear LLP

(57) ABSTRACT

According to one embodiment, a magnetic recording medium includes a substrate, an auxiliary layer formed on the substrate, and at least one perpendicular magnetic recording layer formed on the auxiliary layer. The perpendicular magnetic recording layer includes a magnetic dot pattern. The perpendicular magnetic recording layer is made of an alloy material containing one element selected from iron and cobalt, and one element selected from platinum and palladium. This alloy material has the $L1_0$ structure, and is (001)-oriented. The auxiliary layer includes a dot-like first region covered with the magnetic dot pattern, and a second region not covered with the magnetic dot pattern. The first region is made of one metal selected from (100)-oriented nickel and (100)-oriented iron. The second region contains an oxide of the metal used in the first region.

16 Claims, 4 Drawing Sheets

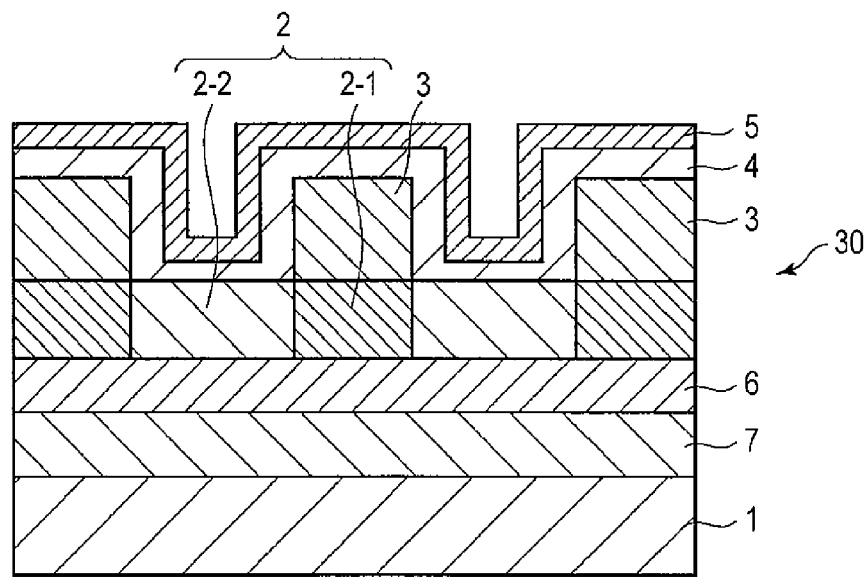
F I G. 3
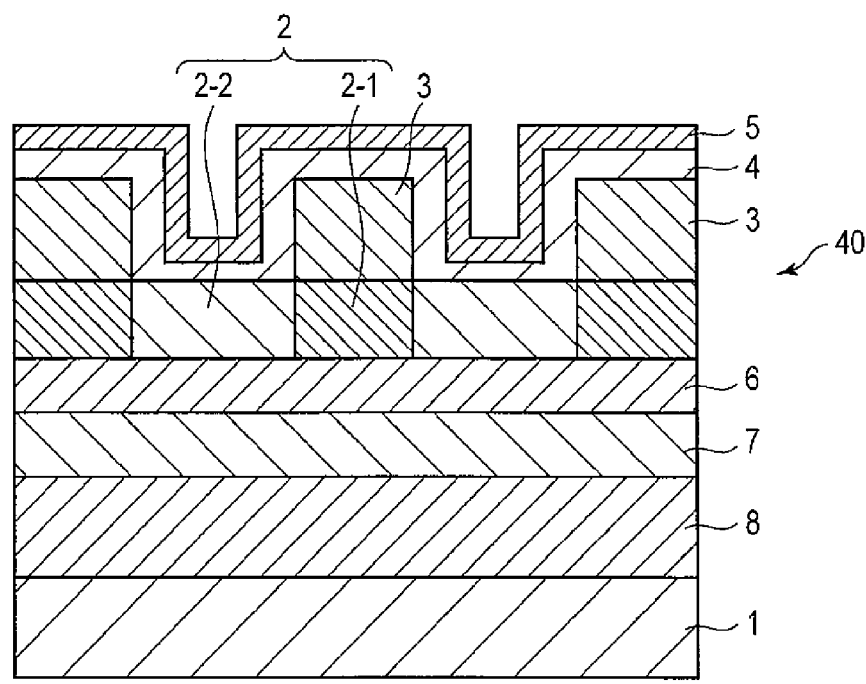
F I G. 4

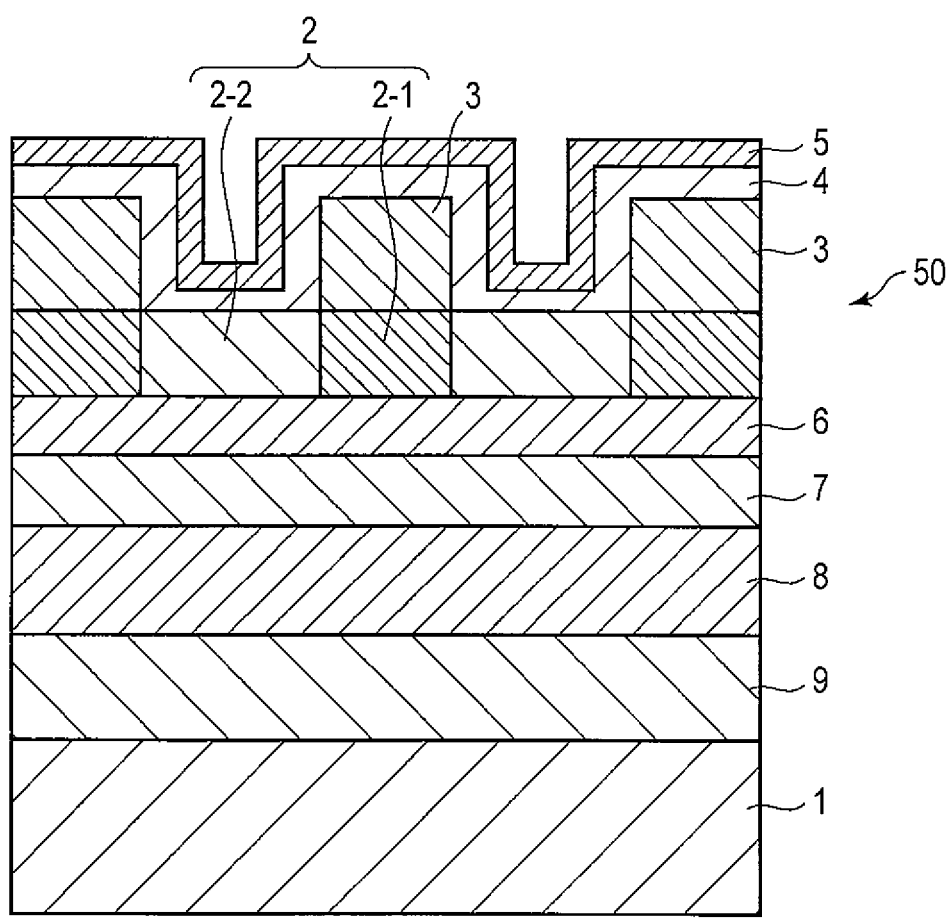
F I G. 5

PERPENDICULAR MAGNETIC RECORDING MEDIUM, METHOD OF MANUFACTURING THE SAME, AND MAGNETIC RECORDING/REPRODUCTION APPARATUS

CROSS-REFERENCE TO RELATED APPLICATIONS

This application is based upon and claims the benefit of priority from prior Japanese Patent Application No. 2011-098303, filed Apr. 26, 2011, the entire contents of which are incorporated herein by reference.

FIELD

Embodiments described herein relate generally to a perpendicular magnetic recording medium and magnetic recording/reproduction apparatus.

BACKGROUND

Magnetic memory devices (HDDs) mainly used in computers to record and reproduce information are recently beginning to be used in various applications because they have large capacities, inexpensiveness, high data access speeds, a high data retaining reliability, and the like, and they are now used in various fields such as household video decks, audio apparatuses, and automobile navigation systems. As the range of applications of the HDDs extends, demands for large storage capacities increase, and high-density HDDs are more and more extensively developed in recent years.

As a magnetic recording method of presently commercially available HDDs, a perpendicular magnetic recording method is recently rapidly finding widespread use as a technique replacing the conventional in-plane magnetic recording method. In the perpendicular magnetic recording method, magnetic crystal grains forming a perpendicular magnetic recording layer for recording information have the axis of easy magnetization in a direction perpendicular to a substrate.

To increase the recording density of the perpendicular magnetic recording medium, noise must be reduced while a high thermal stability is maintained. A method generally used as a noise reducing method is to reduce the magnetic interaction between the magnetic crystal grains in the recording layer by magnetically isolating the grains in the film surface, and decrease the size of the grains themselves at the same time. A practical example of the generally used method is a method of adding $SiO_2$ or the like to the recording layer, thereby forming a perpendicular magnetic recording layer having a so-called granular structure in which each magnetic crystal grain is surrounded by a grain boundary region mainly containing the additive. If noise is reduced by this method, however, it is inevitably necessary to increase the magnetic anisotropic energy (Ku) of the magnetic crystal grains, as the magnetization reversal volume reduces, in order to ensure a high thermal stability. If the magnetic anisotropic energy of the magnetic crystal grains is increased, however, a saturation magnetic field Hs and coercive force Hc also increase. Since this increases a recording magnetic field necessary for magnetization reversal for data write as well, the writability of a recording head decreases. As a consequence, the recording/reproduction characteristics deteriorate.

To solve this problem, a patterned medium in which magnetic dots are formed by micropatterning a perpendicular magnetic recording layer and are magnetically isolated from each other is being studied. In the patterned medium, the magnetic crystal grains in the perpendicular magnetic recording layer need only be magnetically isolated not for every crystal grain but for every magnetic dot having a size corresponding to one bit and containing a few to a few ten crystal grains. This makes the magnetization reversal volume larger than that of the granular structure. Accordingly, the Ku value required to assure a high thermal stability can be decreased. This makes it possible to suppress the increases in Hs and Hc, and suppress a magnetic field (switching field) necessary for magnetization reversal.

On the other hand, in the patterned medium, the switching field distribution (SFD) of each magnetic dot must be minimized in order to allow a designated magnetic dot to reliably reverse magnetization with respect to a recording magnetic field having a given preset intensity, and prevent magnetization reversal of adjacent dots. One big cause of the SFD is the influence of the magnetostatic interaction between dots. That is, the magnitude of a demagnetizing field generated in a given dot from surrounding dots changes in accordance with the difference between recording magnetization patterns. Consequently, an effective switching field changes in accordance with a recording pattern. Since the magnetostatic interaction between dots increases as the dot pitch decreases, the SFD increases as the density increases.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a sectional view showing still another example of the magnetic recording medium according to the embodiment;

FIG. 4 is a sectional view showing still another example of the magnetic recording medium according to the embodiment;

FIG. 5 is a sectional view showing still another example of the magnetic recording medium according to the embodiment.

DETAILED DESCRIPTION

Various embodiments will be described hereinafter with reference to the accompanying drawings.

In general, according to one embodiment, a magnetic recording medium includes a substrate, an auxiliary layer formed on the substrate, and at least one perpendicular magnetic recording layer formed on the auxiliary layer.

The perpendicular magnetic recording layer has a magnetic dot pattern.

The perpendicular magnetic recording layer is made of an alloy material containing one element selected from iron and cobalt, and one element selected from platinum and palladium. This alloy material has the $L1_0$ structure, and is (001)-oriented.

The auxiliary layer includes a dot-like first region covered with the magnetic dot pattern, and a second region not covered with the magnetic dot pattern. The first region is made of one metal selected from (100)-oriented nickel and (100)-oriented iron. The second region contains an oxide of the metal used in the first region.

A protective layer can be formed on the perpendicular magnetic recording layer. Alternatively, a lubricant layer can be formed on the perpendicular magnetic recording layer. The protective layer can be formed between the perpendicular magnetic recording layer and lubricant layer.

Also, a method of manufacturing the magnetic recording medium according to the embodiment includes the step of forming, on a substrate, an auxiliary layer by depositing one metal selected from (100)-oriented nickel and (100)-oriented iron, the step of forming, on the auxiliary layer, a perpendicular magnetic recording layer made of a (001)-oriented alloy containing one element selected from iron and cobalt and one element selected from platinum and palladium, and having the $L1_0$ structure, the step of partially exposing the auxiliary layer by processing the perpendicular magnetic recording layer into a magnetic dot pattern, and the step of depositing a protective layer on the perpendicular magnetic recording layer.

Before the formation of the protective layer, e.g., during or after the formation of the magnetic dot pattern, the magnetic dot pattern and auxiliary layer are exposed to an oxidizing ambient, and the partially exposed auxiliary layer is oxidized by using the magnetic dot pattern as a mask, thereby forming, in the auxiliary layer, a dot-like first region covered with the magnetic dot pattern and made of one metal selected from (100)-oriented nickel and (100)-oriented iron, and a second region not covered with the magnetic dot pattern and containing an oxide of the metal used in the first region.

This embodiment provides a perpendicular magnetic recording medium that reduces the switching field distribution of each magnetic dot and has a high thermal decay resistance, thereby making high-density recording possible.

Figure 1:
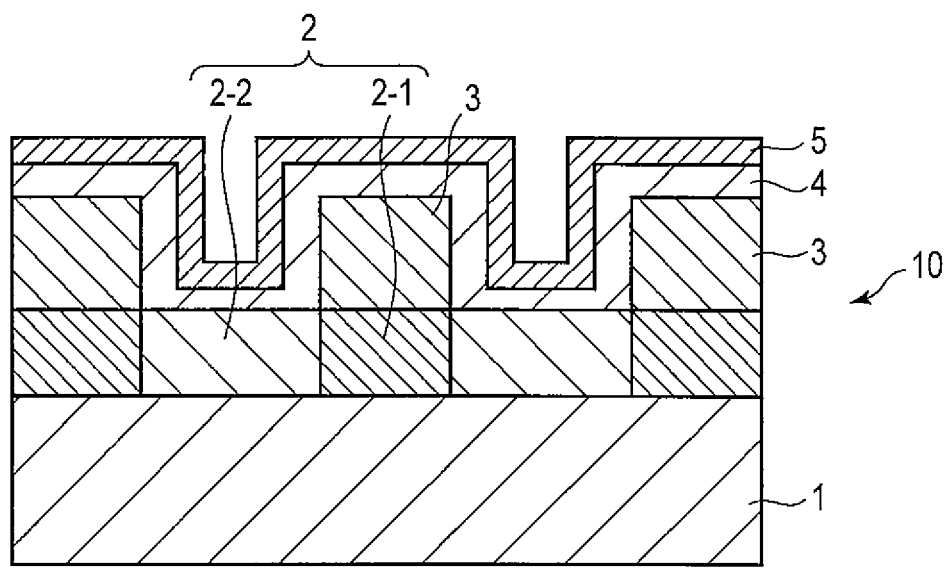
FIG. 1 is a sectional view showing an example of a magnetic recording medium according to an embodiment.

FIG. 1 is a sectional view showing an example of the patterned medium according to the embodiment.

In a patterned medium 10 as shown in FIG. 1, an auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of Ni or Fe are two-dimensionally surrounded by a second region 2-2 made of an oxide of Ni or Fe. Hard magnetic dots 3 are stacked on the first regions 2-1 made of Ni or Fe.

As a nonmagnetic substrate used in the embodiment, it is possible to use, e.g., a glass substrate, an Al-based alloy substrate, an Si single-crystal substrate having an oxidized surface, ceramics, or plastic. In addition, the same effect can be expected even when the surface of any of these nonmagnetic substrates is plated with an NiP alloy or the like.

(Magnetic Dot Patterning Method (Milling))

In the perpendicular magnetic recording layer, a pattern of finely arranged magnetic dots can be formed by patterning. An example of the patterning method is as follows. That is, after the medium surface is coated with a mask material such as SOG (Spin On Glass), a three-dimensional pattern is formed on the mask by nanoimprinting by using a stamper on which the magnetic dot pattern is transferred. Then, the perpendicular magnetic recording layer is etched by Ar ion milling, and the SOG mask is removed by reactive ion milling (RIE) by using $CF_4$ gas.

(Recording Layer Material)

The magnetic dot pattern of the magnetic recording medium according to the embodiment contains hard magnetic crystal grains having the axis of easy magnetization perpendicular to the substrate. As the hard magnetic crystal grain material in the embodiment, it is possible to use a material that achieves an appropriate coercive force Hc and nucleation magnetic field Hn in order to suppress the generation of a reverse magnetic domain against, e.g., an external magnetic field and floating magnetic field, and has a high uniaxial magnetocrystalline anisotropic constant Ku in order to obtain a sufficient thermal decay resistance.

As the hard magnetic crystal material, a material having the $L1_0$ structure and mainly containing a magnetic metal element and noble metal element is used. The magnetic metal is at least one element selected from Fe and Co, and the noble metal element is at least one element selected from the group consisting of Pt and Pd. More specifically, it is possible to use an Fe—Pt alloy, Co—Pt alloy, or Fe—Pd alloy in which the atomic number ratio of magnetic element:noble metal element falls within the range of 4:6 to 6:4. When an ordered alloy is formed by giving the $L1_0$ structure to any of these materials, the material can achieve a very high Ku of $10^7$ erg/cc or more in the c-axis direction, and hence has a high thermal decay resistance. In addition, the composition of the noble metal element is very high, i.e., 40% to 60% in any of these materials. Accordingly, the material often exhibits a high oxidation resistance in an oxidizing step (to be described later). Whether the hard magnetic crystal grains forming the magnetic recording layer have the $L1_0$ structure can be confirmed by an X-ray diffraction apparatus. The $L1_0$ structure exists if ordered lattice reflection peaks representing planes such as (001) and (003) which are not observed in a disordered face-centered cubic lattice (FCC) can be observed at diffraction angles matching the respective interplanar spacings. Also, an order S is generally used as an index for evaluating whether the hard magnetic crystal grains have a structure close to a complete $L1_0$ structure. The structure is a complete $L1_0$ structure when S=1, and a complete disordered structure when S=0. The Ku of the above-described alloy generally increases as the order S increases. The order S can be evaluated by the following equation by using (001) and (002) peak integrated intensities obtained by X-ray diffraction measurements.

$$S=0.72(I_{001}/I_{002})^{1/2}$$

where $I_{001}$ and $I_{002}$ are respectively the diffraction peak integrated intensities of (001) and (002) planes.

Whether the hard magnetic crystal material is oriented in the (001) plane (c-axis) can also be confirmed by a general X-ray diffraction apparatus.

(Perpendicular Magnetic Recording Layer Thickness)

The total thickness of the perpendicular magnetic recording layer is determined by the required value of the system, and can be, e.g., 0.5 (inclusive) to 30 (exclusive) nm. The total thickness can also be 5 (inclusive) to 10 (exclusive) nm. If the total thickness is less than 0.5 nm, the signal intensity of the recording/reproduction characteristics significantly decreases. If the total thickness is equal to or larger than 30 nm, the above-described patterning process becomes difficult to perform.

(Method of Manufacturing Perpendicular Magnetic Recording Layer)

When the substrate temperature is increased to 250° C. to 700° C. during the deposition of the above-described hard magnetic material, the formation of the ordered alloy is promoted. The substrate temperature can further be increased to 300° C. to 400° C. If the substrate temperature is less than 250° C., the order S decreases. If the substrate temperature exceeds 700° C., deterioration such as cracking often occurs on the substrate.

Also, when depositing the above-described hard magnetic material by sputtering, the order S increases when the sputtering gas pressure of, e.g., Ar is 3 to 12 Pa. Deposition can further be performed at 5 to 10 Pa.

(Auxiliary Layer)

In the magnetic recording medium according to the embodiment, the auxiliary layer made of a material mixture containing (100)-oriented Ni or (100)-oriented Fe and its oxide is formed below the perpendicular magnetic recording layer. As shown in FIG. 1, a metal or alloy containing at least one element selected from (100)-oriented Ni and (100)-oriented Fe is mainly formed in a region covered with the magnetic dot pattern, and the oxide of Ni or Fe is mainly formed in a region not covered with the hard magnetic dots. (100)-oriented Ni or (100)-oriented Fe has a relatively high lattice matching with a hard magnetic crystal grain material (to be described later), and hence can orient the hard magnetic crystal grains formed in the upper layer along the c-axis, and point the axis of easy magnetization in the direction perpendicular to the substrate.

Ni or Fe used in the auxiliary layer according to the embodiment is a ferromagnetic metal, and its oxide is an antiferromagnetic or weak magnetic material. Since the magnetic dot pattern is in contact with Fe or Ni existing immediately below the interface with the auxiliary layer, a strong exchange interaction acts between them. On the other hand, the ferromagnetic metal crystal grains in the auxiliary layer are surrounded by the antiferromagnetic or weak magnetic oxide. This weakens the exchange interaction acting between the ferromagnetic metal crystal grains. Consequently, a strong exchange interaction between the hard magnetic dots and ferromagnetic metal crystal grains and a weak exchange interaction in the oxide region act in series between adjacent hard magnetic dots, thereby generating a weak exchange interaction. Since the weak exchange magnetic field acting on the dots always functions in a direction to cancel demagnetizing fields from surrounding hard magnetic dots, the influence of the demagnetizing fields can be reduced. This makes it possible to effectively reduce the SFD described previously. If Ni or Fe regions come in direct contact with each other, the function of weakening the exchange interaction between the hard magnetic dots deteriorates. Accordingly, the above-described oxide must be formed over the entire film thickness of the auxiliary layer. Whether the oxide of Ni or Fe is formed in the region not covered with the hard magnetic dots and formed over the entire film thickness of the auxiliary layer can be confirmed by, e.g., observing the medium surface by TEM-EDX analysis combining energy dispersive X-ray spectroscopy (EDX) with transmission electron microscope (TEM) observation.

(Method of Forming Auxiliary Layer)

An example of a method of forming the auxiliary layer as described above is a method in which after Fe or Ni and a perpendicular magnetic recording layer are sequentially deposited on a substrate, the medium surface is exposed to an oxidizing ambient after Ar milling of perpendicular magnetic recording layer patterning or mask removal, thereby oxidizing a metal portion not covered with hard magnetic dots. Consequently, as shown in FIG. 1, the ferromagnetic metal is not oxidized but maintained in regions covered with the hard magnetic dots, and an oxide is formed in only an uncovered region. In this structure, the crystal faces need not be oriented in one direction in the oxide region.

As a method of exposure to the oxidizing ambient, it is possible to use a thermal oxidation method by which the medium is heated to, e.g., 200° C. or more in an oxygen ambient, or a method of irradiating the medium with an oxygen plasma or oxygen ions. On the other hand, when using a method of exposing the medium surface to the atmosphere at room temperature, the progress of oxidation is slow, so a long-time process is often necessary.

In the oxidizing process as described above, not only the auxiliary layer surface but also the side surfaces of dots of the milled magnetic dot pattern are exposed to the oxidizing ambient. Since, however, the magnetic recording medium according to the embodiment uses the above-described $L1_0$ ordered alloy material as the magnetic dot pattern material, it is possible to suppress the deterioration of the magnetic characteristics caused by the oxidation of the magnetic dot pattern.

(Auxiliary Layer Thickness)

The auxiliary layer thickness can be 0.5 to 15 nm, and can also be 1 to 5 nm. If this thickness is less than 0.5 nm, the above-described SFD reducing effect hardly appears. If the thickness exceeds 15 nm, the demagnetizing field of the ferromagnetic metal crystal grain itself increases, and the Hn of the perpendicular magnetic recording layer tends to deteriorate.

(Underlayer)

Figure 2:
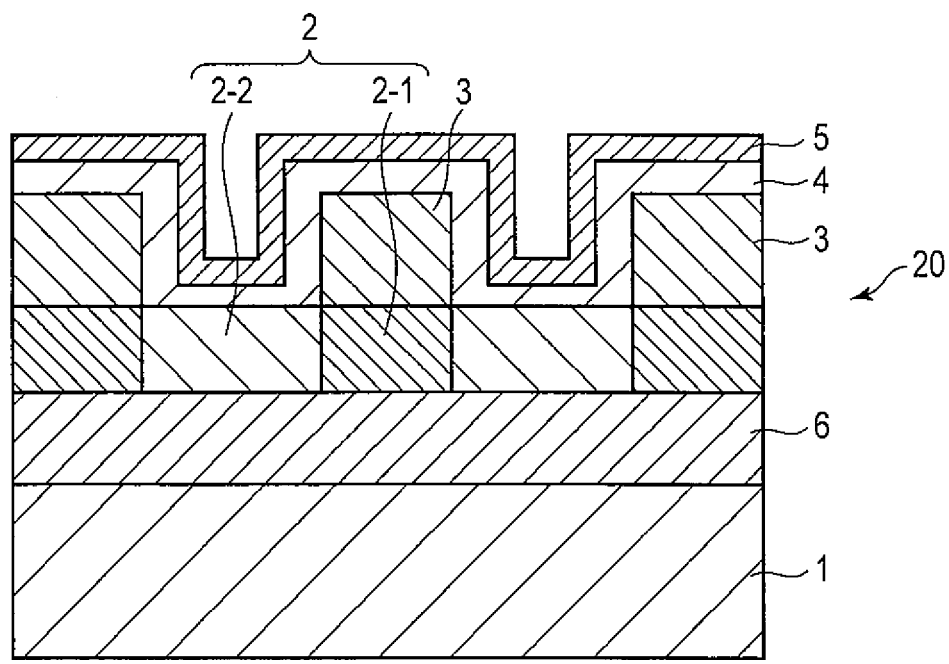
FIG. 2 is a sectional view showing another example of the magnetic recording medium according to the embodiment.

FIG. 2 is a sectional view showing another example of the patterned medium according to the embodiment.

In a patterned medium 20 as shown in FIG. 2, a nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of Ni or Fe are two-dimensionally surrounded by a second region 2-2 made of an oxide of Ni or Fe. Hard magnetic dots 3 are stacked on the first regions 2-1 made of Ni or Fe.

To reduce the orientation dispersion in the auxiliary layer and perpendicular magnetic recording layer, at least one underlayer made of a nonmagnetic material can be formed between the auxiliary layer and substrate. This nonmagnetic underlayer can also reduce the exchange interaction between the auxiliary layer and perpendicular magnetic recording layer, which poses a problem when using a soft magnetic underlayer (to be described later).

As a practical material, it is possible to use (100)-oriented MgO, (100)-oriented TiN, or (100)-oriented Cr. The (100) orientation dispersion of the ferromagnetic metal crystal grains in the auxiliary layer can be reduced by using any of these materials.

(Underlayer Thickness)

The thickness of the nonmagnetic underlayer can be, e.g., 1 to 50 nm, and can also be 5 to 10 nm. If this thickness is less than 1 nm, the above-described orientation dispersion reducing effect does not remarkably appear. If the thickness exceeds 50 nm, the surface roughness caused by the increase in crystal grain size in the underlayer often becomes conspicuous.

(Seed Layer)

FIG. 3 is a sectional view showing still another example of the patterned medium according to the embodiment.

In a patterned medium 30 as shown in FIG. 3, an amorphous seed layer 7, nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of Ni or Fe are two-dimensionally surrounded by a second region 2-2 made of an oxide of Ni or Fe. Hard magnetic dots 3 are stacked on the first regions 2-1 made of Ni or Fe.

When a seed layer made of an amorphous alloy containing Ni is formed between the nonmagnetic underlayer and substrate, the (100) orientation dispersion of the nonmagnetic underlayer improves. "Amorphous" herein mentioned does not necessarily mean a completely amorphous material such as glass, and may also include a film in which fine crystal grains having a grain size of 2 nm or less are locally oriented at random. As the alloy containing Ni as described above, it is possible to use an alloy system such as an Ni—Nb, Ni—Ta, Ni—Zr, Ni—W, Ni—Mo, or Ni—V alloy. An amorphous film readily forms when the Ni content in any of these alloys is 20 to 70 at %. In addition, the seed layer surface can be exposed to an oxygen-containing ambient.

The thickness of the amorphous seed layer can be 1 to 50 nm, and can also be 5 to 10 nm. If this thickness is less than 1 nm, the above-described orientation dispersion reducing effect does not noticeably appear. If the thickness exceeds 50 nm, the magnetic space between a soft magnetic underlayer (to be described later) and the perpendicular magnetic recording layer excessively spreads, and the writability of the recording/reproduction characteristics decreases.

(Soft Magnetic Underlayer)

FIG. 4 is a sectional view showing still another example of the patterned medium according to the embodiment.

In a patterned medium 40 as shown in FIG. 4, a soft magnetic underlayer 8, amorphous seed layer 7, nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of Ni or Fe are two-dimensionally surrounded by a second region 2-2 made of an oxide of Ni or Fe. Hard magnetic dots 3 are stacked on the first regions 2-1 made of Ni or Fe.

A so-called perpendicular double-layered medium is obtained by forming a high-permeability soft magnetic underlayer between the nonmagnetic underlayer and substrate. In this perpendicular double-layered medium, the soft magnetic underlayer horizontally passes a recording magnetic field from a magnetic head, e.g., a single-pole head for magnetizing the perpendicular magnetic recording layer, and returns the magnetic field toward the magnetic head, i.e., performs a part of the function of the magnetic head. The soft magnetic underlayer can achieve a function of applying a sufficiently steep perpendicular magnetic field to the magnetic field recording layer, thereby increasing the recording/reproduction efficiency.

Examples of the soft magnetic layer as described above are CoZrNb, CoB, CoTaZr, FeSiAl, FeTaC, CoTaC, NiFe, Fe, FeCoB, FeCoN, FeTaN, and CoIr.

The soft magnetic underlayer may also be a multilayered film including two or more layers. In this multilayered film, the materials, compositions, and thicknesses of the layers may be different. It is also possible to form a triple-layered structure in which two soft magnetic underlayers are stacked with a thin Ru layer being sandwiched between them. The thickness of the soft magnetic underlayer is properly adjusted by taking account of the balance between the OW characteristic and SNR.

(Adhesion Layer)

FIG. 5 is a sectional view showing still another example of the patterned medium according to the embodiment.

In a patterned medium 50 as shown in FIG. 5, an adhesion layer 9, soft magnetic underlayer 8, amorphous seed layer 7, nonmagnetic underlayer 6, auxiliary layer 2, perpendicular magnetic recording layer 3, protective layer 4, and lubricant layer 5 are sequentially stacked on a substrate 1. The perpendicular magnetic recording layer 3 has a pattern in which hard magnetic dots are finely arranged. The auxiliary layer 2 has a structure in which first regions 2-1 made of Ni or Fe are two-dimensionally surrounded by a second region 2-2 made of an oxide of Ni or Fe. Hard magnetic dots 3 are stacked on the first regions 2-1 made of Ni or Fe.

To increase the mechanical adhesion between the substrate and soft magnetic underlayer, an adhesion layer made of, e.g., Cr, Ti, or an alloy of Cr or Ti may also be formed.

A protective layer can be formed on the perpendicular magnetic recording layer according to the embodiment. Examples of the protective layer are C, diamond-like carbon (DLC), $SiN_x$, $SiO_x$, and $CN_x$.

As a lubricant used in the embodiment, perfluoropolyether (PFPE) or the like can be used.

As a method of depositing each layer, it is possible to use vacuum deposition, sputtering, chemical vapor deposition, or laser abrasion. As sputtering, it is possible to use single-element sputtering using a composite target, or multi-element simultaneous sputtering using targets of different materials.

Figure 6:
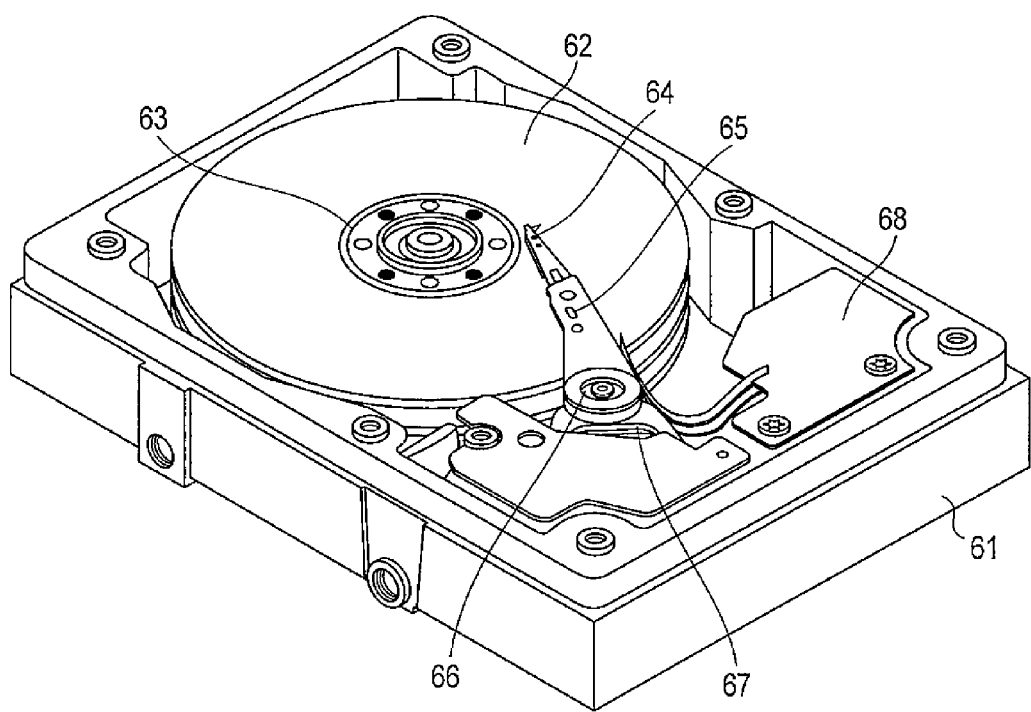
FIG. 6 is a partially exploded perspective view showing an example of a magnetic recording/reproduction apparatus according to the embodiment.

FIG. 6 is a partially exploded perspective view of an example of a magnetic recording/reproduction apparatus according to the embodiment.

The magnetic recording/reproduction apparatus according to the embodiment includes the above-described patterned medium and a recording/reproduction head.

In a magnetic recording/reproduction apparatus 60 according to the embodiment, a rigid magnetic disk 62 for recording information according to the embodiment is mounted on a spindle 63, and rotated at a predetermined rotational speed by a spindle motor (not shown). A slider 64 on which a recording head for recording information by accessing the magnetic disk 62 and an MR head for reproducing information are mounted is fixed to the distal end of a suspension 65 made of a thin leaf spring. The suspension 65 is connected to one end of an arm 66 including a bobbin for holding a driving coil (not shown).

A voice coil motor 67, which is a type of linear motor, is arranged at the other end of the arm 66. The voice coil motor 67 includes the driving coil (not shown) wound up on the bobbin of the arm 66, and a magnetic circuit including a permanent magnet and counter yoke facing each other so as to sandwich the driving coil between them.

The arm 66 is held by ball bearings (not shown) formed in two, upper and lower portions of a fixed shaft, and pivoted by the voice coil motor 67. That is, the voice coil motor 67 controls the position of the slider 64 on the magnetic disk 62. Note that reference numeral 61 in FIG. 6 denotes a housing.

EXAMPLES

The embodiment will be explained in more detail below by way of its examples.

Example 1

A 2.5-inch nonmagnetic glass substrate (TS-10SX available from OHARA) having the shape of a hard disk was placed in a vacuum chamber of the c-3010 sputtering apparatus available from ANELVA.

After the vacuum chamber of the sputtering apparatus was evacuated to $1\times10^{-5}$ Pa or less, 10-nm thick Cr-50% Ti as an adhesion layer, a 50-nm thick Co-5% Zr-5% Nb alloy as a soft magnetic underlayer, 5-nm thick MgO as a nonmagnetic underlayer, and 5-nm thick Fe as an auxiliary layer were deposited. The substrate was then heated to 300° C. by using an infrared lamp heater, and 5-nm thick $Fe_{50}Pt_{50}$ was deposited as a perpendicular $Fe_{50}Pt_{50}$ magnetic recording layer.

After that, the perpendicular magnetic recording layer was patterned into hard magnetic crystal grain dots by the following procedure. That is, the substrate was removed from the sputtering apparatus, the medium surface was coated with a mask material such as SOG (Spin On Glass), and a three-dimensional pattern was formed on the mask by nanoimprinting by using a stamper on which a 17-nm pitch dot pattern was transferred. Then, the substrate was placed in the sputtering apparatus again, and the perpendicular magnetic recording layer was etched by ion gun chamber Ar ion milling. Subsequently, the SOG mask was removed by RIE in a reactive ion milling (RIE) chamber by using $CF_4$ gas. After the mask was removed, the substrate was heated to 200° C. by using the infrared lamp heater, and the medium was exposed to oxygen gas at 1 Pa for 10 sec, thereby performing an oxidizing process. After that, 6-nm thick C was deposited as a protective film, and the protective film was coated with perfluoropolyether as a lubricant layer by dipping, thereby manufacturing a patterned medium.

The Ar pressure was 0.7 Pa when depositing Cr-50% Ti, Co-5% Zr-5% Nb, MgO, Fe, and C, and 5 Pa when depositing $Fe_{50}Pt_{50}$. Sputtering targets were Cr-50% Ti, Co-5% Zr-5% Nb, MgO, Fe, $Fe_{50}Pt_{50}$, and C targets each having a diameter of 164 mm. MgO was deposited by RF sputtering, and the rest were deposited by DC sputtering. The input power to each target was 500 W. The distance between each target and the substrate was 50 mm. In addition, media were manufactured by using Ni instead of Fe as the auxiliary layer, and $Co_{50}Pt_{50}$ and $Fe_{50}Pd_{50}$ instead of $Fe_{50}Pt_{50}$.

Comparative Example 1

As a comparative example, a patterned medium was manufactured following the same procedures as in Example 1 except that no oxidizing process was performed.

Comparative Example 2

As a comparative example, a patterned medium was manufactured following the same procedures as in Example 1 except that no auxiliary layer was formed.

The crystal structure and crystal face orientation of each obtained patterned medium were evaluated by the θ-2θ method by generating a Cu—Kα line at an acceleration voltage of 45 kV with a filament current of 40 mA by using the X'pert-MRD X-ray diffraction apparatus available from Philips.

The composition of the section of each patterned medium was analyzed by using TEM-EDX at an acceleration voltage of 400 kV.

The magnetic characteristic in the direction perpendicular to the perpendicular magnetic recording layer of each patterned medium was evaluated by measuring a residual magnetization curve with a maximum applied magnetic field of 20 kOe by using the model-10 vibrating sample magnetometer (VSM) available from ADE, U.S.A. The SFD of each patterned medium was evaluated by a half-width calculated by differentiating the obtained residual magnetization curve by the applied magnetic field.

To check the recording stability of the magnetic dots of each patterned medium, AC demagnetization was performed on the medium by using the VSM, and the magnetization configuration in the AC state was evaluated by using a magnetic force microscope (MFM).

The results of XRD evaluation demonstrate that any hard magnetic dot was crystalline, and any magnetic crystal grain had the $L1_0$ structure and was (001)-oriented.

Fe or Ni in the auxiliary layer of the medium of each of Example 1 and Comparative Example 1 was (100)-oriented.

The soft magnetic underlayer of any medium was amorphous.

Any magnetic underlayer was (100)-oriented.

The results of TEM-EDX evaluation reveal that in the auxiliary layer of the medium of Example 1, both Fe and Fe oxide or Ni and Ni oxide existed, Fe or Ni existed in a region covered with the hard magnetic dot, and the oxide existed in a region not covered with the hard magnetic dot. In the direction of depth, the oxide existed over 5 nm, i.e., the same as the auxiliary layer. On the other hand, the auxiliary layer of the medium of Comparative Example 1 contained no such oxide, and was made of Fe or Ni alone.

When the magnetization configuration after AC demagnetization was observed with the MFM, no magnetic domain was formed over a plurality of hard magnetic dots in the media of Example 1 and Comparative Example 2, so magnetization reversal by each hard magnetic dot was possible. On the other hand, large magnetic domains having a diameter of a few ten nm were formed in the medium of Comparative Example 1, indicating that the Fe or Ni auxiliary layer exerted a strong exchange interaction between the hard magnetic dots. Accordingly, magnetization reversal by each hard magnetic dot was difficult, so the medium was unsuitable as a patterned medium.

Table 1 shows the residual coercive force Hr and SFD obtained by VSM measurement, the Fe (100) orientation dispersion $\Delta\theta_{50}$ (Fe) or Ni (100) orientation dispersion $\Delta\theta_{50}$ (Ni) and the FePt (001) orientation dispersion $\Delta\theta_{50}$ (Mag) obtained by XRD evaluation, and the order S.

TABLE 1

|  |  | Auxiliary layer | Perpendicular magnetic recording layer | $\Delta\theta_{50}$ (Fe, Ni) (°) | $\Delta\theta_{50}$ (Mag) (°) | S | Hr' (kOe) | SFD (%) |
|---|---|---|---|---|---|---|---|---|
| Example | 1 | Fe | FePt | 4.1 | 4.0 | 0.95 | 10.2 | 8.1 |
|  | 1 | Ni | FePt | 4.2 | 4.3 | 0.96 | 9.5 | 8.0 |
| Comparative | 1 | Fe | FePt | 4.1 | 3.9 | 0.95 | 5.5 | 6.1 |
| Example | 1 | Ni | FePt | 4.1 | 4.3 | 0.95 | 6.7 | 7.0 |
|  | 2 | — | FePt | — | 4.7 | 0.90 | 10.2 | 35 |

When compared to Comparative Example 2, the SFD of the medium of Example 1 was significantly reduced. The medium using $Co_{50}Pt_{50}$ or $Fe_{50}Pd_{50}$ instead of $Fe_{50}Pt_{50}$ as the hard magnetic dot material showed the same tendency. Note that the SFD of the medium of Comparative Example 1 apparently reduced probably because a strong exchange interaction was acting between the dots as described above.

Example 2

Patterned media were manufactured following the same procedures as in Example 1 except that the substrate heating temperature was changed from 200° C. to 750° C. after the NiO layer was formed.

The results of XRD evaluation indicate that the hard magnetic dots of any medium were crystalline, and any magnetic crystal grain had the $L1_0$ structure and was (001)-oriented.

Also, Fe in the auxiliary layer of any medium was (100)-oriented.

The soft magnetic underlayer of any medium was amorphous.

Any nonmagnetic underlayer was (100)-oriented.

The results of TEM-EDX evaluation reveal that in the auxiliary layer of any medium, both Fe and Fe oxide existed, Fe existed in a region covered with the hard magnetic dot, and Fe oxide existed in a region not covered with the hard magnetic dot. In the direction of depth, Fe oxide existed over 5 nm, i.e., the same as the auxiliary layer thickness.

When the magnetization configuration after AC demagnetization was observed with the MFM, no magnetic domain was formed over a plurality of hard magnetic dots in any medium, so magnetization reversal by each hard magnetic dot was possible.

Table 2 shows the residual coercive force Hr and SFD obtained by VSM measurement, the Fe (100) orientation dispersion $\Delta\theta_{50}$ (Fe) and FePt (001) orientation dispersion $\Delta\theta_{50}$ (Mag) obtained by XRD evaluation, and the order S.

TABLE 2

|  |  | Substrate temperature (° C.) | $\Delta\theta_{50}$ (Fe, Ni) (°) | $\Delta\theta_{50}$ (Mag) (°) | S | Hr (kOe) | SFD (%) |
|---|---|---|---|---|---|---|---|
| Example | 2 | 200 | 4.1 | 4.5 | 0.33 | 4.1 | 16.1 |
|  | 2 | 250 | 4.0 | 4.5 | 0.81 | 9.3 | 10.4 |
|  | 1 | 300 | 4.1 | 4.0 | 0.95 | 10.2 | 8.1 |
|  | 2 | 350 | 4.1 | 4.2 | 0.94 | 10.3 | 8.1 |
|  | 2 | 400 | 4.2 | 4.4 | 0.93 | 10.2 | 8.3 |
|  | 2 | 450 | 4.1 | 5.0 | 0.84 | 9.6 | 10.0 |
|  | 2 | 500 | 4.2 | 5.2 | 0.85 | 9.5 | 10.3 |
|  | 2 | 600 | 4.2 | 5.3 | 0.84 | 9.7 | 10.2 |
|  | 2 | 700 | 4.2 | 5.1 | 0.82 | 9.5 | 10.2 |
|  | 2 | 800 | 4.2 | 6.5 | 0.81 | 9.0 | 15.2 |

The order S remarkably improved when the substrate temperature was 250° C. or more, and further improved when the substrate temperature was 300° C. to 400° C.

Example 3

Patterned media were manufactured following the same procedures as in Example 1 except that the Ar pressure was changed from 0.5 to 15 Pa when depositing the perpendicular magnetic recording layer.

The results of XRD evaluation indicate that the hard magnetic dots of any medium were crystalline, and any magnetic crystal grain had the $L1_0$ structure and was (001)-oriented.

Also, Fe in the auxiliary layer of any medium was (100)-oriented.

The soft magnetic underlayer of any medium was amorphous.

Any nonmagnetic underlayer was (100)-oriented.

The results of TEM-EDX evaluation reveal that in the auxiliary layer of any medium, both Fe and Fe oxide existed, Fe existed in a region covered with the hard magnetic dot, and Fe oxide existed in a region not covered with the hard magnetic dot. In the direction of depth, Fe oxide existed over 5 nm, i.e., the same as the auxiliary layer thickness.

When the magnetization configuration after AC demagnetization was observed with the MFM, no magnetic domain was formed over a plurality of hard magnetic dots in any medium, so magnetization reversal by each hard magnetic dot was possible.

Table 3 shows the residual coercive force Hr and SFD obtained by VSM measurement, the Fe (100) orientation dispersion $\Delta\theta_{50}$ (Fe) and FePt (001) orientation dispersion $\Delta\theta_{50}$ (Mag) obtained by XRD evaluation, and the order S.

TABLE 3

|  |  | Deposition pressure (Pa) | $\Delta\theta_{50}$ (Fe, Ni) (°) | $\Delta\theta_{50}$ (Mag) (°) | S | Hr (kOe) | SFD (%) |
|---|---|---|---|---|---|---|---|
| Example | 3 | 0.5 | 4.1 | 3.9 | 0.55 | 5.3 | 15.5 |
|  | 3 | 1 | 4.0 | 4.1 | 0.65 | 6.1 | 14.3 |
|  | 3 | 3 | 4.1 | 4.1 | 0.81 | 9.5 | 10.2 |
|  | 1 | 5 | 4.1 | 4.0 | 0.95 | 10.2 | 8.1 |
|  | 3 | 9 | 4.2 | 4.9 | 0.97 | 10.5 | 8.2 |
|  | 3 | 12 | 4.0 | 5.0 | 0.95 | 10.2 | 8.2 |
|  | 3 | 15 | 4.1 | 5.9 | 0.79 | 9.6 | 9.9 |

The order S noticeably improved when the perpendicular magnetic recording layer deposition pressure was 3 to 12 Pa, and further improved when the deposition pressure was 5 to 10 Pa.

Example 4

A patterned medium was manufactured following the same procedures as in Example 1 except that the method of the oxidizing process after mask removal was changed to the following method.

After mask removal, the oxidizing process was performed in the ion gun chamber at room temperature by irradiating the medium surface with oxygen ions at an acceleration voltage of 500 V for 10 sec.

In addition, a medium was manufactured by performing the oxidizing process in the RIE chamber at room temperature by irradiating the medium surface with an oxygen plasma at a substrate bias power of 100 W and an oxygen pressure of 1 Pa for 10 sec.

Comparative Example 3

As a comparative example, a patterned medium was manufactured following the same procedures as in Example 1 except that the method of the oxidizing process after mask removal was changed to the following method.

After mask removal, the substrate was removed from the sputtering apparatus, and the oxidizing process was performed at room temperature by exposing the medium surface to the atmosphere for 1 hr.

The results of XRD evaluation indicate that any hard magnetic dot was crystalline, and any magnetic crystal grain had the $L1_0$ structure and was (001)-oriented.

Fe or Ni in the auxiliary layer of any medium was (100)-oriented.

The soft magnetic underlayer of any medium was amorphous.

Any nonmagnetic underlayer was (100)-oriented.

The results of TEM-EDX evaluation reveal that in the auxiliary layer of the medium of Example 4, both Fe and Fe oxide or Ni and Ni oxide existed, Fe or Ni existed in a region covered with the hard magnetic dot, and the oxide existed in a region not covered with the hard magnetic dot. In the direction of depth, the oxide existed over 5 nm, i.e., the same as the auxiliary layer. On the other hand, it was impossible to clearly confirm the existence of any oxide in the auxiliary layer of the medium of Comparative Example 3.

When the magnetization configuration after AC demagnetization was observed with the MFM, no magnetic domain was formed over a plurality of hard magnetic dots in the medium of Example 4, so magnetization reversal by each hard magnetic dot was possible. On the other hand, in the medium of Comparative Example 3, large magnetic domains having a diameter of a few ten nm or more were formed, and almost no oxide existed in the Fe or Ni auxiliary layer, indicating that a strong exchange interaction was acting between the hard magnetic dots. Accordingly, magnetization reversal by each hard magnetic dot was difficult, so the medium was unsuitable as a patterned medium.

Table 4 shows the residual coercive force Hr and SFD obtained by VSM measurement, the Fe (100) orientation dispersion $\Delta\theta_{50}$ (Fe) or Ni (100) orientation dispersion $\Delta\theta_{50}$ (Ni) and the FePt (001) orientation dispersion $\Delta\theta_{50}$ (Mag) obtained by XRD evaluation, and the order S.

TABLE 4

|  | Oxidizing process | Perpendicular magnetic recording layer | $\Delta\theta_{50}$ (Fe, Ni) (°) | $\Delta\theta_{50}$ (Mag) (°) | S | Hr (kOe) | SFD (%) |
|---|---|---|---|---|---|---|---|
| Example 4 | Ion beam irradiation | FePt | 4.1 | 4.0 | 0.96 | 10.5 | 7.8 |
| Example 4 | Plasma irradiation | FePt | 4.0 | 4.1 | 0.96 | 10.6 | 7.7 |
| Comparative Example 3 | Atmospheric exposure | FePt | 4.1 | 4.0 | 0.95 | 6.8 | 6.3 |
| Example 1 | Thermal oxidation | FePt | 4.1 | 4.0 | 0.95 | 10.2 | 8.1 |

Similarly to the medium of Example 1, the medium of Example 4 had the SFD reducing effect. The medium using $Co_{50}Pt_{50}$ or $Fe_{50}Pd_{50}$ instead of $Fe_{50}Pt_{50}$ as the hard magnetic dot material showed the same tendency. Note that the SFD of the medium of Comparative Example 3 apparently reduced perhaps because a strong exchange interaction was acting between the dots as described above.

Example 5

Patterned media were manufactured following the same procedures as in Example 1 except that TiN, Cr, and NiO were used instead of MgO as the nonmagnetic underlayer.

The results of XRD evaluation indicate that any hard magnetic dot was crystalline, and any magnetic crystal grain had the $L1_0$ structure and was (001)-oriented.

Fe or Ni in the auxiliary layer of any medium was (100)-oriented.

The soft magnetic underlayer of any medium was amorphous.

Any nonmagnetic underlayer was (100)-oriented.

The results of TEM-EDX evaluation reveal that in the auxiliary layer of any medium, both Fe and Fe oxide or Ni and Ni oxide existed, Fe or Ni existed in a region covered with the hard magnetic dot, and the oxide existed in a region not covered with the hard magnetic dot. In the direction of depth, the oxide existed over 5 nm, i.e., the same as the auxiliary layer.

When the magnetization configuration after AC demagnetization was observed with the MFM, no magnetic domain was formed over a plurality of hard magnetic dots in any medium, so magnetization reversal by each hard magnetic dot was possible.

Table 5 shows the residual coercive force Hr and SFD obtained by VSM measurement, the Fe (100) orientation dispersion $\Delta\theta_{50}$ (Fe) or Ni (100) orientation dispersion $\Delta\theta_{50}$ (Ni) and the FePt (001) orientation dispersion $\Delta\theta_{50}$ (Mag) obtained by XRD evaluation, and the order S.

TABLE 5

|  | Nonmagnetic underlayer | $\Delta\theta_{50}$ (Fe, Ni) (°) | $\Delta\theta_{50}$ (Mag) (°) | S | Hr (kOe) | SFD (%) |
|---|---|---|---|---|---|---|
| Example 5 | TiN | 4.1 | 4.4 | 0.92 | 10.8 | 8.4 |
| Example 5 | Cr | 3.8 | 3.9 | 0.94 | 10.4 | 8.1 |
| Example 5 | NiO | 3.9 | 4.2 | 0.95 | 10.8 | 8.5 |
| Example 1 | MgO | 4.1 | 4.0 | 0.95 | 10.2 | 8.1 |

Similarly to the medium of Example 1, the medium of Example 5 had the SFD reducing effect. The medium using $Co_{50}Pt_{50}$ or $Fe_{50}Pd_{50}$ instead of $Fe_{50}Pt_{50}$ as the hard magnetic dot material showed the same tendency.

Example 6

After a soft magnetic underlayer was deposited in the same manner as in Example 5, 5-nm thick Ni-40% Ta was deposited as an amorphous seed layer. Then, Ar-1% $O_2$ gas was supplied such that the chamber internal pressure was $5 \times 10^{-2}$ Pa, and the surface of the amorphous seed layer was exposed to this $Ar/O_2$ ambient for 5 sec. After that, 5-nm thick Cr was deposited as a nonmagnetic underlayer, and Fe deposition, substrate heating, perpendicular magnetic recording layer deposition, patterning, oxidation, protective film deposition, and lubricant coating were sequentially performed following the same procedures as in Example 4. Media using Ni-40% Nb, Ni-40% Zr, Ni-40% Mo, and Ni-40% V as amorphous seed layers were also manufactured.

The results of XRD evaluation indicate that any hard magnetic dot was crystalline, and any magnetic crystal grain had the $L1_0$ structure and was (001)-oriented.

Fe or Ni in the auxiliary layer of any medium was (100)-oriented.

The soft magnetic underlayer of any medium was amorphous.

Cr in the nonmagnetic underlayer of any medium was (100)-oriented.

The seed layer of any medium was amorphous.

The results of TEM-EDX evaluation reveal that in the auxiliary layer of any medium, both Fe and Fe oxide or Ni and Ni oxide existed, Fe or Ni existed in a region covered with the hard magnetic dot, and the oxide existed in a region not covered with the hard magnetic dot. In the direction of depth, the oxide existed over 5 nm, i.e., the same as the auxiliary layer.

When the magnetization configuration after AC demagnetization was observed with the MFM, no magnetic domain was formed over a plurality of hard magnetic dots in any medium, so magnetization reversal by each hard magnetic dot was possible.

Table 6 shows the residual coercive force Hr and SFD obtained by VSM measurement, the Fe (100) orientation dispersion $\Delta\theta_{50}$ (Fe) or Ni (100) orientation dispersion $\Delta\theta_{50}$ (Ni) and the FePt (001) orientation dispersion $\Delta\theta_{50}$ (Mag) obtained by XRD evaluation, and the order S.

TABLE 6

| | Amorphous seed layer | $\Delta\theta_{50}$ (Fe, Ni) (°) | $\Delta\theta_{50}$ (Mag) (°) | S | Hr (kOe) | SFD (%) |
|---|---|---|---|---|---|---|
| Example 6 | NiTa | 3.0 | 2.8 | 0.91 | 10.8 | 5.8 |
| Example 6 | NiNb | 3.1 | 3.2 | 0.94 | 10.6 | 6.2 |
| Example 6 | NiZr | 3.0 | 3.1 | 0.93 | 10.6 | 6.0 |
| Example 6 | NiMo | 3.1 | 3.3 | 0.94 | 10.7 | 6.1 |
| Example 6 | NiV | 2.9 | 3.2 | 0.91 | 10.1 | 6.4 |
| Example 5 | — | 3.8 | 3.9 | 0.94 | 10.4 | 8.1 |

When using the amorphous seed layer, the (100) orientation distribution in the auxiliary layer and the (001) orientation dispersion of the hard magnetic crystal grains significantly reduced, and the SFD remarkably reduced. The medium using $Co_{50}Pt_{50}$ or $Fe_{50}Pd_{50}$ instead of $Fe_{50}Pt_{50}$ as the hard magnetic dot material showed the same tendency.

The embodiment or each example described above provides a patterned medium capable of high-density recording by reducing the switching field distribution of each magnetic dot and increasing the thermal decay resistance, thereby making high-density recording possible.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium comprising:
 a substrate;
 an auxiliary layer on the substrate; and
 a perpendicular magnetic recording layer on the auxiliary layer, the perpendicular magnetic recording layer comprising a magnetic dot pattern made of a (001)-oriented alloy material comprising one element selected from the group consisting of iron and cobalt and one element selected from the group consisting of platinum and palladium, and having an L10 structure,
 wherein the auxiliary layer comprises a dot-like first region covered with the magnetic dot pattern and made of a metal selected from the group consisting of (100)-oriented nickel and (100)-oriented iron; and
 wherein the auxiliary layer further comprises a second region not covered with the magnetic dot pattern, the second region comprising an oxide of the metal.

2. The medium of claim 1, wherein the oxide of the metal in the second region is an oxidized layer of a metal selected from the group consisting of (100)-oriented nickel and (100)-oriented iron oxidized in an oxidizing ambient by using the magnetic dot pattern as a mask.

3. The medium of claim 1, further comprising a nonmagnetic underlayer between the substrate and the auxiliary layer.

4. The medium of claim 3, wherein the nonmagnetic underlayer comprises at least one material selected from the group consisting of a (100)-oriented nickel oxide, a (100)-oriented magnesium oxide, a (100)-oriented titanium nitride, and (100)-oriented chromium.

5. The medium of claim 3, further comprising, between the nonmagnetic underlayer and the substrate, an amorphous seed layer comprising at least one alloy selected from the group consisting of an Ni—Nb alloy, an Ni—Ta alloy, an Ni—Zr alloy, an Ni—Mo alloy, and an Ni—V alloy.

6. The medium of claim 3, further comprising a soft magnetic underlayer between the substrate and the nonmagnetic underlayer.

7. A magnetic recording medium manufacturing method comprising:
 forming, on a substrate, an auxiliary layer by depositing a metal selected from the group consisting of (100)-oriented nickel and (100)-oriented iron;
 forming, on the auxiliary layer, a perpendicular magnetic recording layer made of a (001)-oriented alloy comprising an element selected from the group consisting of iron and cobalt and an element selected from the group consisting of platinum and palladium, and having an L10 structure;
 partially exposing the auxiliary layer by processing the perpendicular magnetic recording layer into a magnetic dot pattern; and
 depositing a protective layer on the perpendicular magnetic recording layer,
 wherein before the protective layer is formed, the magnetic dot pattern and the auxiliary layer are exposed to an oxidizing ambient, and the partially exposed auxiliary layer is oxidized by using the magnetic dot pattern as a mask, thereby forming, in the auxiliary layer, a dot-like first region covered with the magnetic dot pattern and made of the metal, and a second region not covered with the magnetic dot pattern, the second region comprising an oxide of the metal.

8. The method of claim 7, wherein the substrate is heated to 250° C. to 700° C. when forming the perpendicular magnetic recording layer material.

9. The method of claim 7, wherein sputtering at a pressure of 3 to 12 Pa is used inwhen depositing the perpendicular magnetic recording layer.

10. The method of claim 7, wherein exposing the magnetic dot pattern and the auxiliary layer to an oxidizing ambient comprises selecting a process from oxygen plasma irradiation, oxygen ion beam irradiation, and heating in an oxygen ambient.

11. A magnetic recording/reproduction apparatus comprising:
- a magnetic recording medium comprising
- a substrate,
- an auxiliary layer on the substrate, and
- a perpendicular magnetic recording layer on the auxiliary layer, the perpendicular magnetic recording layer comprising a magnetic dot pattern made of a (001)-oriented alloy material comprising one element selected from the group consisting of iron and cobalt and one element selected from the group consisting of platinum and palladium, and having an L10 structure,
- wherein the auxiliary layer comprises a dot-like first region covered with the magnetic dot pattern and made of a metal selected from the group consisting of (100)-oriented nickel and (100)-oriented iron, and
- wherein the auxiliary layer further comprises a second region not covered with the magnetic dot pattern, the second region comprising an oxide of the metal; and
- a recording/reproduction head.

12. The apparatus of claim 11, wherein the oxide of the metal in the second region is an oxidized layer of a metal selected from the group consisting of (100)-oriented nickel and (100)-oriented iron oxidized in an oxidizing ambient by using the magnetic dot pattern as a mask.

13. The apparatus of claim 11, further comprising a nonmagnetic underlayer between the substrate and the auxiliary layer.

14. The apparatus of claim 13, wherein the nonmagnetic underlayer comprises at least one material selected from the group consisting of a (100)-oriented nickel oxide, a (100)-oriented magnesium oxide, a (100)-oriented titanium nitride, and (100)-oriented chromium.

15. The apparatus of claim 13, further comprising, between the nonmagnetic underlayer and the substrate, an amorphous seed layer comprising at least one alloy selected from the group consisting of an Ni—Nb alloy, an Ni—Ta alloy, an Ni—Zr alloy, an Ni—Mo alloy, and an Ni—V alloy.

16. The apparatus of claim 13, further comprising a soft magnetic underlayer between the substrate and the nonmagnetic underlayer.

* * * * *